(12) United States Patent
Shikama et al.

(10) Patent No.: US 9,545,788 B1
(45) Date of Patent: Jan. 17, 2017

(54) VELOCITY DETECTING APPARATUS AND LIQUID EJECTING APPARATUS

(71) Applicant: Brother Kogyo Kabushiki Kaisha, Nagoya-shi, Aichi-ken (JP)

(72) Inventors: Yasuhito Shikama, Nagoya (JP); Kohei Terada, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/086,442

(22) Filed: Mar. 31, 2016

(30) Foreign Application Priority Data

Sep. 30, 2015 (JP) ................. 2015-193061

(51) Int. Cl.
*B41J 2/045* (2006.01)
*G01P 3/36* (2006.01)

(52) U.S. Cl.
CPC ......... *B41J 2/04508* (2013.01); *B41J 2/04586* (2013.01); *G01P 3/36* (2013.01)

(58) Field of Classification Search
CPC ............ H04H 1/00734; H04H 1/00002; H04H 1/00029; H04H 1/00045; B41J 29/38; B41J 2/125; B41J 11/0095; B41J 11/42; B41J 2/04508; B41J 2/04526; B41J 2/04586; B41J 11/008
See application file for complete search history.

(56) References Cited

U.S. PATENT DOCUMENTS 9,162,451 B2 * 10/2015 Yorimoto ................. B41J 2/125

FOREIGN PATENT DOCUMENTS

| JP | H06/255194 A | 9/1994 |
| JP | 2004-138386 A | 5/2004 |
| JP | 2004-142199 A | 5/2004 |
| JP | 2005-225181 A | 8/2005 |
| JP | 2014-019093 A | 2/2014 |

* cited by examiner

*Primary Examiner* — Thinh H Nguyen
(74) *Attorney, Agent, or Firm* — Banner & Witcoff, Ltd.

(57) ABSTRACT

A controller performs: correcting a pre-correction pulse signal and outputting the corrected pre-correction pulse signal as a post-correction pulse signal that switches between third and fourth levels, the correcting including: switching the post-correction pulse signal from the third to fourth level when first or second condition is satisfied, the first condition being that the pre-correction pulse signal switches from the first to second level, the second condition being that duration of the third level exceeds a first reference period; and switching the post-correction pulse signal from the fourth to third level when both of third and fourth conditions are satisfied, the third condition being that duration of the fourth level exceeds a second reference period, the fourth condition being that the pre-correction pulse signal is on the first level; and calculating a relative moving velocity of the moving device based on temporal changes between the third and fourth levels.

18 Claims, 14 Drawing Sheets

VELOCITY DETECTING APPARATUS AND LIQUID EJECTING APPARATUS

CROSS REFERENCE TO RELATED APPLICATIONS

This application claims priority from Japanese Patent Application No. 2015-193061 filed Sep. 30, 2015. The entire content of the priority application is incorporated herein by reference.

TECHNICAL FIELD

This disclosure relates to a velocity detecting apparatus and a liquid ejecting apparatus.

BACKGROUND

As a liquid ejecting apparatus that ejects liquid from nozzles, a multifunction peripheral having a printer unit is proposed. In the printer unit of this multifunction peripheral, ink is ejected from a recording head while moving a carriage in the scanning direction. Further, the printer unit of this multifunction peripheral includes a linear encoder having an encoder strip and a sensor unit, as a velocity detecting apparatus that detects velocity of the carriage. The encoder strip extends in the scanning direction, and is formed with encoder slits with particular intervals in the scanning direction. With this configuration, the encoder strip has optically non-transmissive regions without encoder slit and optically transmissive regions formed with encoder slits, that are arranged cyclically in the scanning direction. The sensor unit is provided at the carriage, and has a light emitting element and a light receiving element that are arranged with the encoder strip interposed therebetween. With this configuration, in the sensor unit, the amount of light received by the light receiving element is larger when the light emitting element and the light receiving element face the encoder slit (face an optically transmissive region) than when the light emitting element and the light receiving element do not face the encoder slit (face an optically non-transmissive region). And, the sensor unit outputs a pulse signal corresponding to changes of the amount of light received by the light receiving element. Due to this pulse signal, moving velocity of the carriage can be detected.

SUMMARY

According to one aspect, this specification discloses a velocity detecting apparatus. The velocity detecting apparatus includes a region formation member, an optical sensor, a moving device, and a controller. The region formation member has a first region and a second region that are arranged cyclically in a particular direction. The first region and the second region have different optical characteristics from each other. The optical sensor configured to emit light to the region formation member and to output a pre-correction pulse signal that is on a first level when facing the first region and that is on a second level when facing the second region. The second level is different from the first level. The optical characteristics of the first region and the second region are such that the optical sensor receives a larger amount of light from the second region than from the first region. The moving device is configured to move the optical sensor and the region formation member relative to each other in the particular direction. The controller is configured to control the optical sensor and the moving device. The controller is configured to perform: correcting the pre-correction pulse signal outputted from the optical sensor and outputting the corrected pre-correction pulse signal as a post-correction pulse signal that switches between a third level and a fourth level different from each other, the correcting including: switching the post-correction pulse signal from the third level to the fourth level when at least one of a first condition and a second condition is satisfied, the first condition being that the pre-correction pulse signal switches from the first level to the second level, the second condition being that duration of a section in which the post-correction pulse signal is on the third level exceeds a first reference period; and switching the post-correction pulse signal from the fourth level to the third level when both of a third condition and a fourth condition are satisfied, the third condition being that duration of a section in which the post-correction pulse signal is on the fourth level exceeds a second reference period, the fourth condition being that the pre-correction pulse signal is on the first level; and calculating a relative moving velocity of the moving device based on temporal changes between the third level and the fourth level of the post-correction pulse signal.

According to another aspect, this specification also discloses a liquid ejecting apparatus. The liquid ejecting apparatus includes a carriage, a liquid ejecting head, and a velocity detecting apparatus. The carriage is configured to move reciprocatingly in a scanning direction. The liquid ejecting head is mounted on the carriage. The liquid ejecting head is formed with nozzles and is configured to eject liquid from the nozzles. The velocity detecting apparatus is configured to detect velocity of the carriage. The velocity detecting apparatus includes a region formation member, an optical sensor, and a controller. The region formation member has a first region and a second region that are arranged cyclically in the scanning direction. The first region and the second region have different optical characteristics from each other. The optical sensor is disposed on the carriage. The optical sensor is configured to emit light to the region formation member and to output a pre-correction pulse signal that is on a first level when facing the first region and that is on a second level when facing the second region. The second level is different from the first level. The optical characteristics of the first region and the second region are such that the optical sensor receives a larger amount of light from the second region than from the first region. The controller is configured to control the optical sensor and the carriage. The controller is configured to perform: correcting the pre-correction pulse signal outputted from the optical sensor and outputting the corrected pre-correction pulse signal as a post-correction pulse signal that switches between a third level and a fourth level different from each other, the correcting including: switching the post-correction pulse signal from the third level to the fourth level when at least one of a first condition and a second condition is satisfied, the first condition being that the pre-correction pulse signal switches from the first level to the second level, the second condition being that duration of a section in which the post-correction pulse signal is on the third level exceeds a first reference period; and switching the post-correction pulse signal from the fourth level to the third level when both of a third condition and a fourth condition are satisfied, the third condition being that duration of a section in which the post-correction pulse signal is on the fourth level exceeds a second reference period, the fourth condition being that the pre-correction pulse signal is on the first level; and calculating a moving velocity of the carriage based on temporal changes between the third level and the fourth level of the post-correction pulse signal.

BRIEF DESCRIPTION OF THE DRAWINGS

Embodiments in accordance with this disclosure will be described in detail with reference to the following figures wherein.

DETAILED DESCRIPTION

In the printer unit of the above-described multifunction peripheral, for example, a stain sometimes adheres to the encoder strip, such as that mist generated when ink is ejected from the recording head adheres to the encoder strip. At this time, if a stain adheres to a portion of the encoder strip at which the encoder slit is formed, this reduces the amount of light received by the light receiving element when the light emitting element and the light receiving element face the encoder slit. As a result of that, when the light emitting element and the light receiving element face the portion of the encoder slit to which a stain adheres, it is erroneously detected that the light emitting element and the light receiving element do not face the encoder slit. Hence, if the moving velocity of the carriage is detected based on a pulse signal outputted from the sensor unit, the detected velocity of the carriage is deviated from the actual moving velocity of the carriage.

In view of the foregoing, an example of the object of this disclosure is to provide a velocity detecting apparatus capable of accurately detecting moving velocity of a moving device and a liquid ejecting apparatus capable of accurately detecting moving velocity of a carriage.

Some aspects of this disclosure will be described while referring to the accompanying drawings.

<Overall Configuration of Printer>

Figure 1:
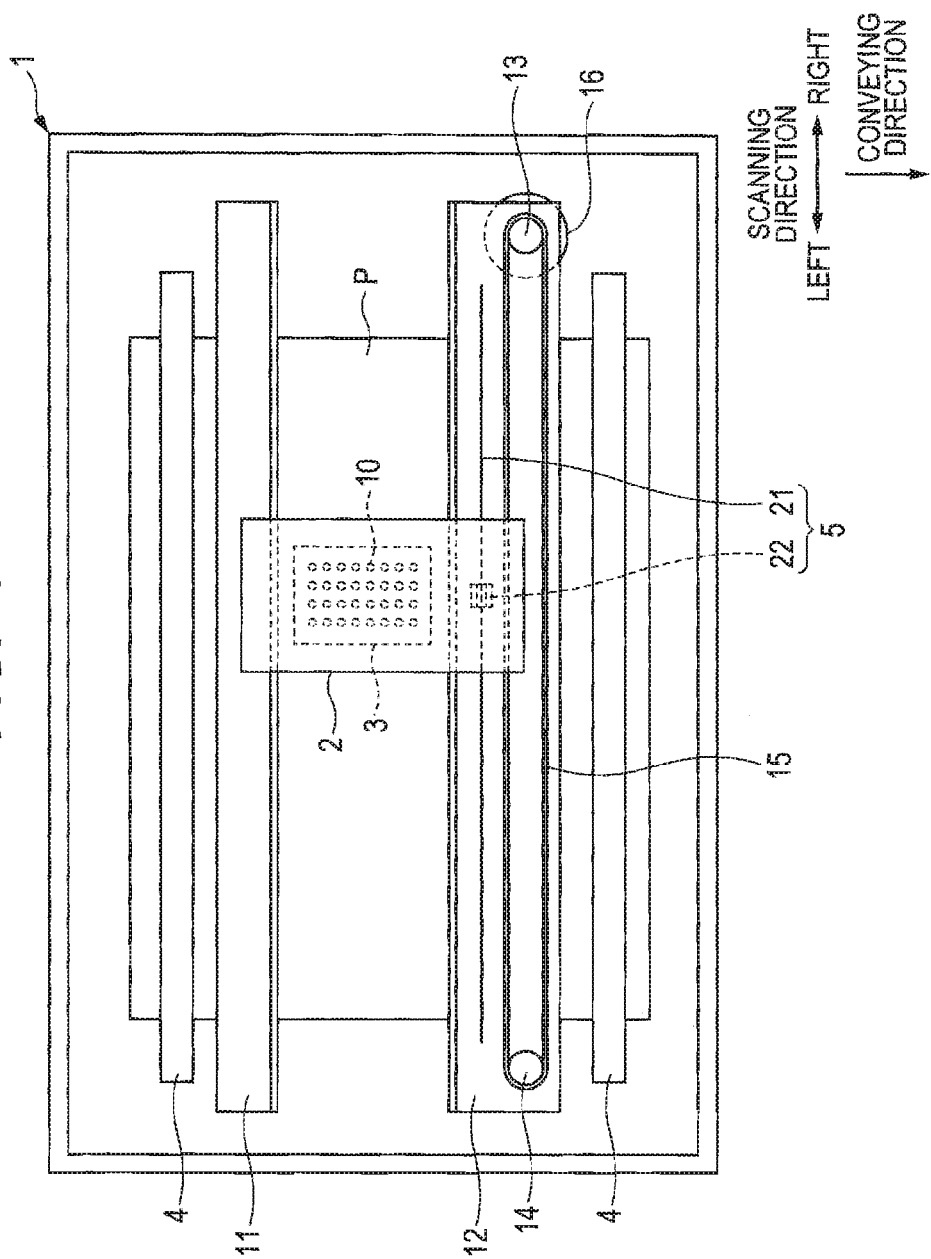
FIG. 1 is a schematic diagram showing a printer according to an embodiment.
Figure 2A:
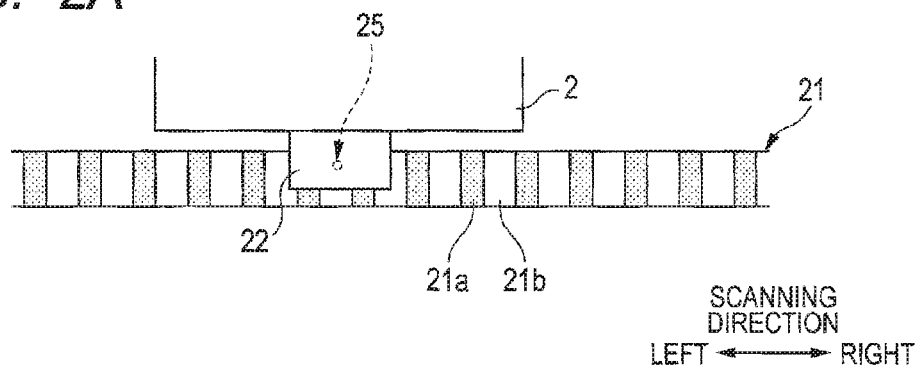
FIG. 2A shows a diagram showing the arrangement of an encoder strip and an optical sensor, as viewed from the downstream side in the conveying direction.
Figure 2B:
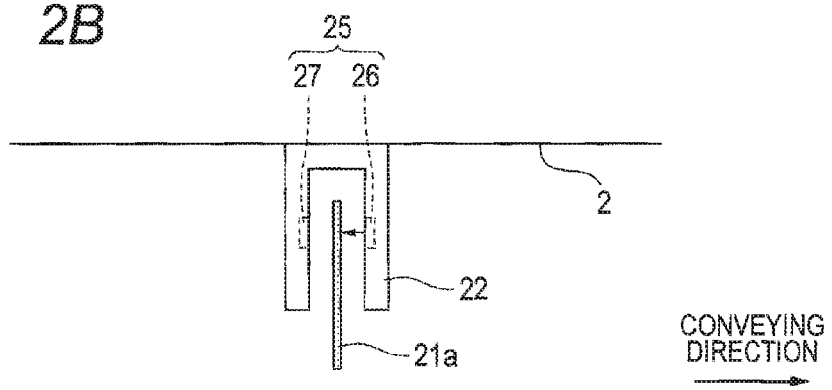
FIG. 2B shows a diagram showing the arrangement of the encoder strip and the optical sensor, as viewed from the left side toward the right side in the scanning direction in a state where the optical sensor faces a first region of the encoder strip.
Figure 2C:
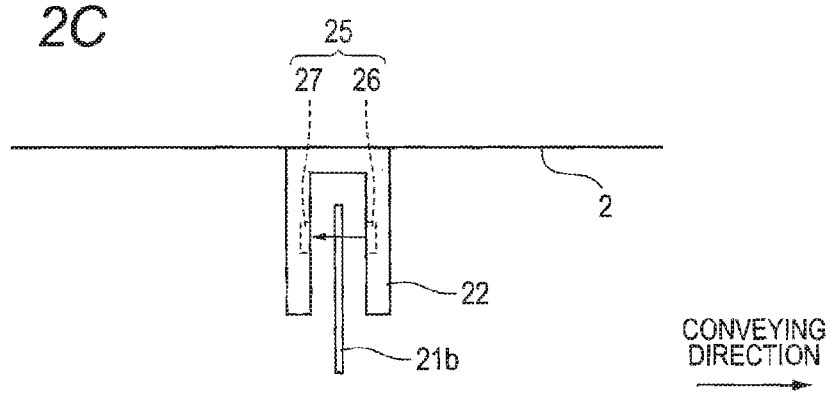
FIG. 2C shows a diagram showing the arrangement of the encoder strip and the optical sensor, as viewed from the left side toward the right side in the scanning direction in a state where the optical sensor faces a second region of the encoder strip.

As shown in FIG. 1, a printer 1 of an embodiment includes a carriage 2 (an example of "moving device"), an inkjet head 3 (an example of "liquid ejecting head"), two paper conveying rollers 4, a linear encoder 5, and so on. The carriage 2 is supported by two guide rails 11, 12 extending in a scanning direction. The guide rail 11 and the guide rail 12 are arranged with an interval in a conveying direction perpendicular to the scanning direction. In the following descriptions, the right and the left in the scanning direction are defined as shown in FIG. 1.

Pulleys 13, 14 are provided at both ends, in the scanning direction, of the upper surface of the guide rail 12 at the downstream side in the conveying direction. An endless belt 15 made of rubber material or the like is looped around the pulleys 13, 14. The carriage 2 is attached to a portion of the belt 15 that is positioned between the pulley 13 and the pulley 14. A carriage motor 16 is coupled to the right-side pulley 13. When the carriage motor 16 is rotated in forward or reverse direction, the pulleys 13, 14 rotate and the belt 15 circularly moves. With this operation, the carriage 2 moves reciprocatingly in the scanning direction.

The inkjet head 3 is mounted on the carriage 2, and ejects ink from a plurality of nozzles 10 formed on the lower surface thereof. The two paper conveying rollers 4 are arranged at the both sides of the inkjet head 3 in the conveying direction. The two paper conveying rollers 4 are driven by a conveying motor 17 and convey recording paper P in the conveying direction.

And, the printer 1 conveys recording paper P in the conveying direction by the paper conveying rollers 4 and ejects ink from the plurality of nozzles 10 of the inkjet head 3 while moving the carriage 2 reciprocatingly in the scanning direction, thereby performing printing on recording paper P.

The linear encoder 5 is a so-called transmissive type. As shown in FIGS. 1 and 2A to 2C, the linear encoder 5 includes an encoder strip 21 (an example of "region formation member") and an encoder sensor 22. The encoder strip 21 is disposed at the upper side of the guide rail 12, and extends in the scanning direction over the moving range of the carriage 2. The encoder strip 21 includes a plurality of first regions 21a and a plurality of second regions 21b that are arranged cyclically (alternately) in the scanning direction (an example of "particular direction"). The first regions 21a are regions that do not transmit light, and the second regions 21b are regions that transmit light. The encoder sensor 22 is mounted on the carriage 2. The encoder sensor 22 includes an optical sensor 25 having a light emitting element 26 and a light receiving element 27. The light emitting element 26 is disposed at the downstream side of the encoder strip 21 in the conveying direction. The light receiving element 27 is disposed at the upstream side of the encoder strip 21 in the conveying direction. Thus, the light emitting element 26 and the light receiving element 27 are arranged such that the encoder strip 21 is interposed therebetween in the conveying direction. The light emitting element 26 emits light toward the light receiving element 27. The light receiving element 27 receives light emitted from the light emitting element 26, and outputs a pre-correction pulse signal Ra described later depending on the amount of received light.

When the carriage 2 moves in the scanning direction, the encoder sensor 22 mounted on the carriage 2 also moves in the scanning direction, and the state of the optical sensor 25 switches alternately between a state in which the optical sensor 25 faces the first region 21a of the encoder strip 21 and a state in which the optical sensor 25 faces the second region 21b. When the optical sensor 25 faces the first region 21a of the encoder strip 21, light emitted from the light emitting element 26 is blocked by the first region 21a, and the light receiving element 27 does not receive light from the light emitting element 26. On the other hand, when the optical sensor 25 faces the second region 21b of the encoder strip 21, light emitted from the light emitting element 26 goes through the second region 21b, and the light receiving element 27 receives light from the light emitting element 26. Thus, the amount of light received by the light receiving element 27 is larger when the optical sensor 25 faces the second region 21b than when the optical sensor 25 faces the first region 21a.

<Pre-Correction Pulse Signal>

Figure 3:
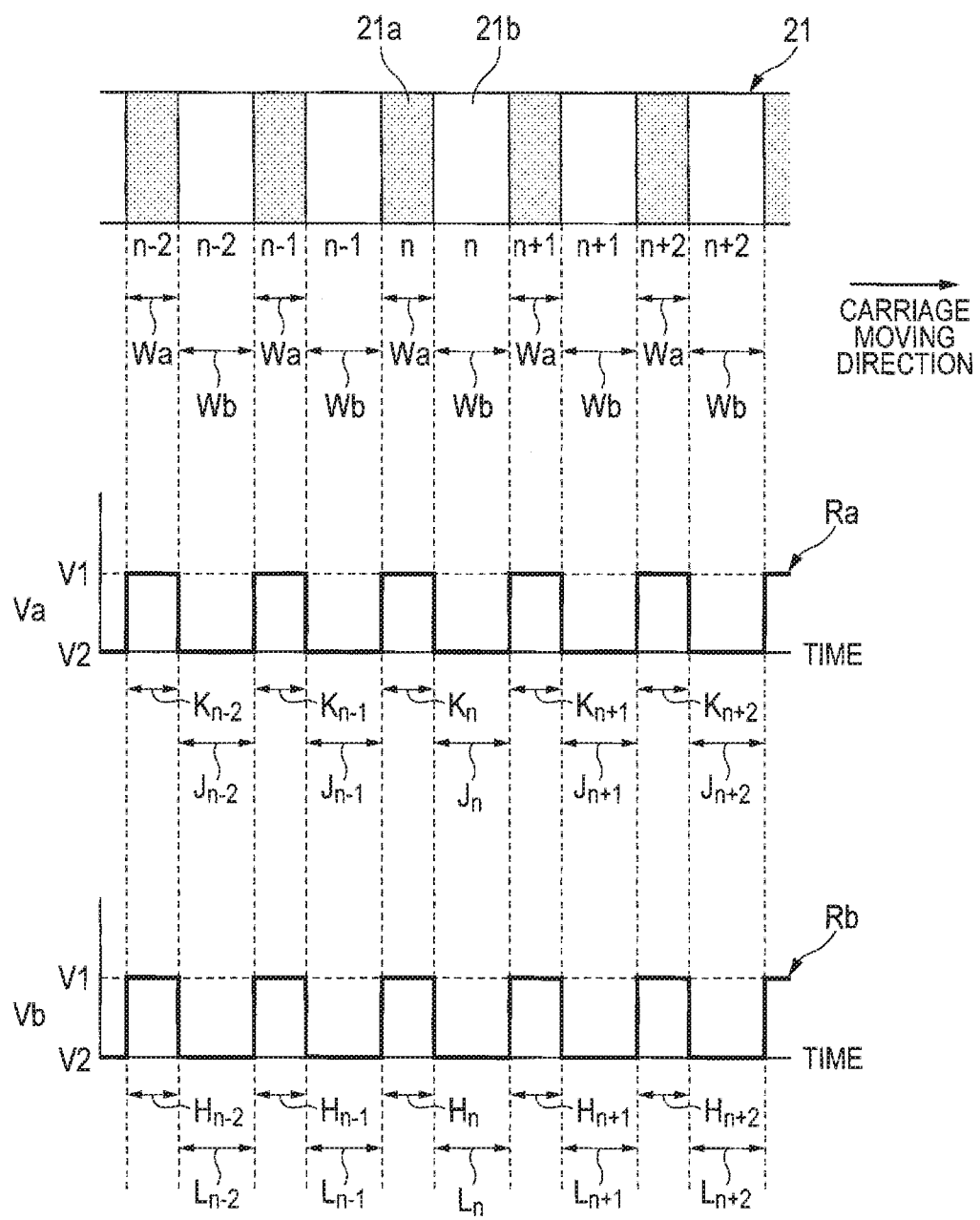
FIG. 3 is a diagram showing a pre-correction pulse signal and a post-correction pulse signal in a case where the encoder strip has no stain.

The light receiving element 27 outputs a pre-correction pulse signal Ra having a potential Va of V1 (an example of "first level") when the amount of received light is smaller than or equal to a threshold value, and having a potential Va of V2 (an example of "second level") (V2<V1) when the amount of received light is larger than the threshold value. The above-mentioned threshold value is larger than the amount of light received by the light receiving element 27 when the optical sensor 25 faces the first region 21a, and is smaller than the amount of light received by the light receiving element 27 when the optical sensor 25 faces the second region 21b. Thus, as shown in FIG. 3, in the pre-correction pulse signal Ra, the potential Va is V1 when the optical sensor 25 faces the first region 21a, and the potential Va is V2 when the optical sensor 25 faces the second region 21b. Here, signs [n−1], n, [n+1], and so on shown below each of the first regions 21a and the second regions 21b in FIG. 3 indicate what number (sequence) the first region 21a or second region 21b corresponds to in the moving direction of the carriage 2.

<Control Device>

Figure 4:
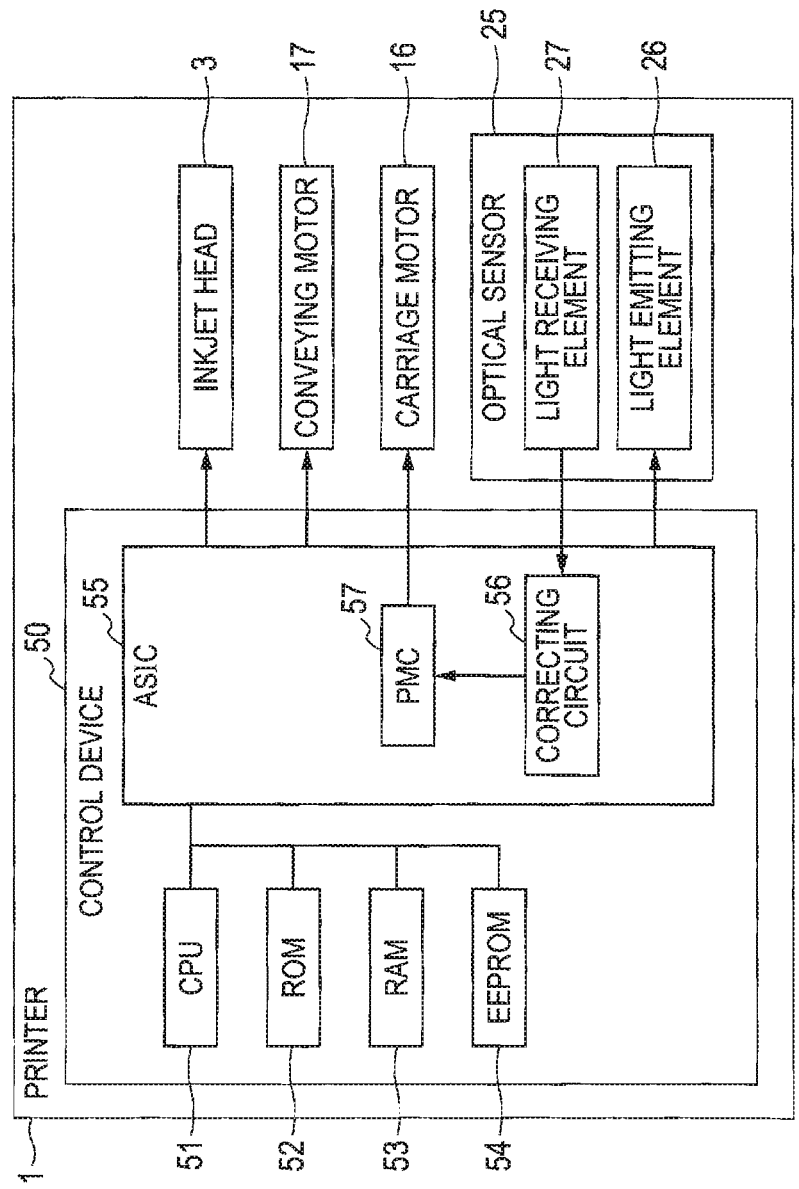
FIG. 4 is a block diagram showing the electrical configuration of the printer.

Next, a control device 50 that controls operations of the printer 1 will be described. As shown in FIG. 4, the control device 50 includes a CPU (Central Processing Unit) 51, a ROM (Read Only Memory) 52, a RAM (Random Access Memory) 53, an EEPROM (Electrically Erasable Programmable Read Only Memory) 54, an ASIC (Application Specific Integrated Circuit) 55, and so on. These elements control operations of the carriage motor 16, the inkjet head 3, the conveying motor 17, the light emitting element 26 of the optical sensor 25, and so on. The ASIC 55 includes circuits of a correcting circuit 56, a PMC (Programmable Machine Controller) 57, and so on. The correcting circuit 56 receives the pre-correction pulse signal Ra from the light receiving element 27, corrects the pre-correction pulse signal Ra, and outputs the corrected signal as a post-correction pulse signal Rb described later. The PMC 57 receives the post-correction pulse signal Rb from the correcting circuit 56. The PMC 57 uses the received post-correction pulse signal Rb to control operations of the carriage motor 16 as will be described later.

In FIG. 4, the control device 50 includes a single CPU 51. In this way, the control device 50 may include a single CPU 51, and the single CPU 51 may perform all the processing by itself. Alternatively, the control device 50 may include a plurality of CPUs 51, and the plurality of CPUs 51 may perform processing in a distributed manner. Further, in FIG. 4, the control device 50 includes a single ASIC 55. In this way, the control device 50 may include a single ASIC 55, and the single ASIC 55 may perform all the processing by itself. Alternatively, the control device 50 may include a plurality of ASICs 55, and the plurality of ASICs 55 may perform processing in a distributed manner.

<Control in Printing>

Figure 5A:
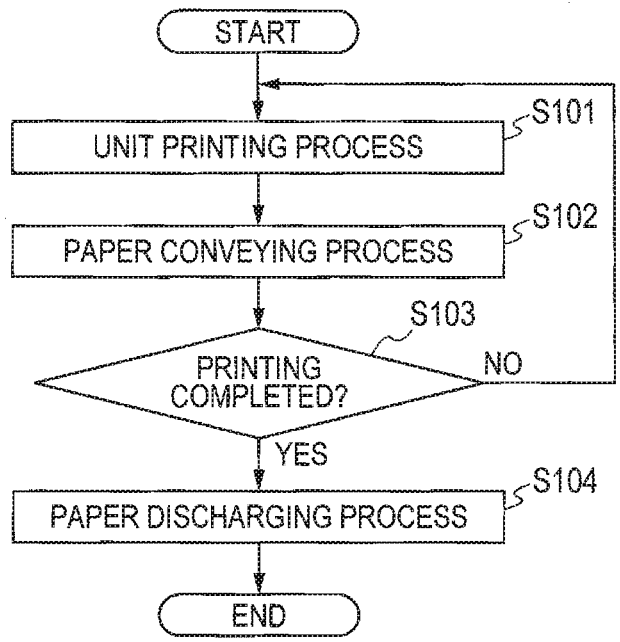
FIG. 5A is a flowchart showing the flow of processes when the printer performs printing.

Next, controls performed when printing is performed on recording paper P in the printer 1 will be described. When printing is performed on recording paper P in the printer 1, as shown in FIG. 5A, the control device 50 repeatedly performs a unit printing process (S101) and a paper conveying process (S102) until printing on recording paper P is completed (S103: NO). The unit printing process in S101 is a process of ejecting ink from the plurality of nozzles 10 of the inkjet head 3 while driving the carriage motor 16 to move the carriage 2 in the scanning direction. The paper conveying process in S102 is a process of driving the conveying motor 17 to convey recording paper P in the conveying direction by a particular distance. When printing on recording paper P is completed (S103: YES), the control device 50 performs a paper discharging process of driving the conveying motor 17 to discharge recording paper P (S104), and ends the flow of FIG. 5A.

Figure 5B:
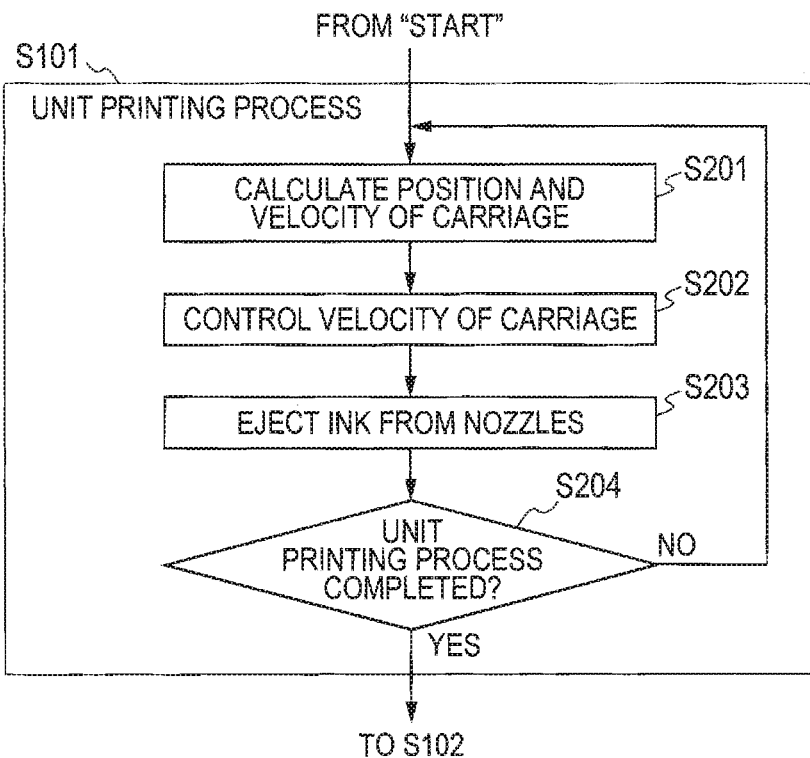
FIG. 5B is a flowchart showing the flow of a unit printing process of FIG. 5A.

The unit printing process in S101 will be described in detail. In the unit printing process in S101, as shown in FIG. 5B, the control device 50 calculates the position of the carriage 2 in the scanning direction and the moving velocity of the carriage 2 (S201). In S201, as will be described later, the control device 50 calculates the position of the carriage 2 in the scanning direction and the moving velocity of the carriage 2 based on the post-correction pulse signal Rb. For example, the moving velocity of the carriage 2 is calculated by dividing an arrangement cycle W (=Wa+Wb) described later by a time period between a rising edge and the next rising edge of the post-correction pulse signal Rb. Then, the control device 50 controls the moving velocity of the carriage 2 based on the moving velocity of the carriage 2 calculated in S201 (S202). Specifically, the control device 50 reduces the rotational speed of the carriage motor 16 when the calculated moving velocity of the carriage 2 is higher than a set moving velocity, and increases the rotational speed of the carriage motor 16 when the calculated moving velocity of the carriage 2 is lower than the set moving velocity. Next, the control device 50 controls the inkjet head 3 to eject ink from the plurality of nozzles 10, based on the position and moving velocity of the carriage 2 calculated in S201 (S203). The control device 50 repeatedly performs the processes of S201 to S203 until the unit printing process is completed (S204: NO). When the unit printing process is completed (S204: YES), the control device 50 advances to the paper conveying process in S102. Although it is illustrated in FIG. 5B that the processes of S202 and S203 are performed sequentially, the processes of S202 and S203 are performed in parallel.

<Correction of Pulse Signal>

Next, correction of the pre-correction pulse signal Ra in the correcting circuit 56 will be described. Here, the post-correction pulse signal Rb obtained by correcting the pre-correction pulse signal Ra is such a pulse signal that the potential Vb switches between V1 (an example of "third level") and V2 (an example of "fourth level").

Figure 6:
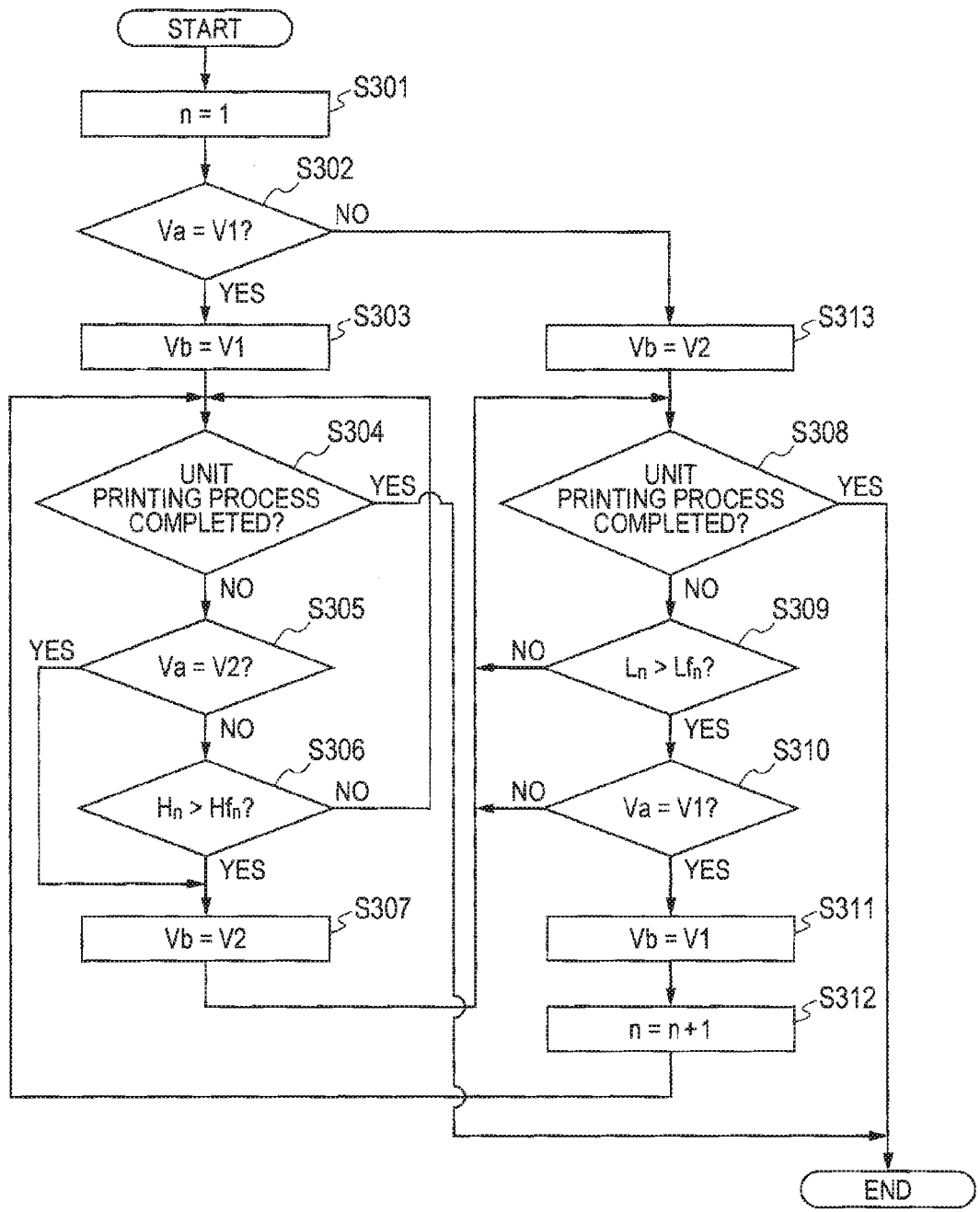
FIG. 6 is a flowchart showing the flow of processes of correcting the pre-correction pulse signal.

The correction of the pre-correction pulse signal Ra is performed in accordance with the flowchart of FIG. 6. The flowchart of FIG. 6 is started when the unit printing process in S101 is started. In order to correct the pre-correction pulse signal Ra, as shown in FIG. 6, the control device 50 first sets a variable n to 1 (S301). Next, when the potential Va of the pre-correction pulse signal Ra at the time of starting the unit printing process in S101 is V1 (S302: YES), the control device 50 sets the potential Vb of the post-correction pulse signal Rb to V1 (S303). After that, when the unit printing process in S101 is continued (S304: NO), while the potential Va of the pre-correction pulse signal Ra is maintained at V1 (S305: NO) and duration $H_n$ (n=1, 2, 3, . . . ) of a section where the potential Vb of the post-correction pulse signal Rb is V1 is shorter than or equal to a particular first reference period $Hf_n$ (n=1, 2, 3, . . . ) (S306: NO), the control device 50 maintains the state where the potential Vb of the post-correction pulse signal Rb is V1. The duration $H_n$ is duration of a section where the potential Vb of the post-correction pulse signal Rb is V1 for the n-th time in the unit printing process. The first reference period $Hf_n$ is an expected value of the duration of the section where the potential Vb of the post-correction pulse signal Rb is V1 for the n-th time. The method of calculating the first reference period $Hf_n$ will be described in detail. When the potential Va of the pre-correction pulse signal Ra switches from V1 to V2 (S305: YES), or when the duration $H_n$ of the section where the potential Vb of the post-correction pulse signal Rb is V1 exceeds the particular first reference period $Hf_n$ (S306: YES), the control device 50 switches the potential Vb of the post-correction pulse signal Rb from V1 to V2 (S307).

After the potential Vb of the post-correction pulse signal Rb is switched from V1 to V2 in S307, if the unit printing process in S101 is still continuing (S308: NO), the control device 50 maintains a state where the potential Vb of the post-correction pulse signal Rb is V2 while the duration $L_n$ (n=1, 2, 3, . . . ) of a section where the potential Vb of the post-correction pulse signal Rb is V2 is shorter than or equal to a particular second reference period $Lf_n$ (n=1, 2, 3, . . . ) (S309: NO) or while the potential Va of the pre-correction pulse signal Ra is V2 (S310: NO). The duration $L_n$ is duration of a section where the potential Vb of the post-correction pulse signal Rb is V2 for the n-th time in the unit printing process. The second reference period $Lf_n$ is an expected value of the duration of the section where the potential Vb of the post-correction pulse signal Rb is V2 for the n-th time. The method of calculating the second reference period $Lf_n$ will be described in detail. When the duration $L_n$ of the section where the potential Vb of the post-correction pulse signal Rb is V2 exceeds the second reference period $Lf_n$ (S309: YES) and the potential Va of the pre-correction pulse signal Ra is V1 (S310: YES), the control device 50 switches the potential Vb of the post-correction pulse signal Rb from V2 to V1 (S311), and adds 1 to n (S312) and returns to S304.

When the potential Va of the pre-correction pulse signal Ra at the time of starting the unit printing process in S101 is V2 (S302: NO), the control device 50 sets the potential Vb of the post-correction pulse signal Rb to V2 (S313), and advances to S308. When it is determined that the unit printing process is completed (S304: YES or S308: YES), the flowchart of FIG. 6 ends.

<First Reference Period and Second Reference Period>

Next, the method of calculating the first reference period $Hf_n$ and the second reference period $Lf_n$ will be described. The EEPROM 54 preliminarily stores first reference periods $Hf_1$, $Hf_2$ and second reference periods $Lf_1$, $Lf_2$ when n=1, 2. For example, the first reference periods $Hf_1$, $Hf_2$ are periods required for the carriage to move by a length Wa of the first region 21a of the encoder strip 21 in the scanning direction, that is, periods calculated by $Hf_1$, $Hf_2$=Wa/S where S is the moving velocity of the carriage 2. Further, for example, the second reference periods $Lf_1$, $Lf_2$ are periods required for the carriage to move by a length Wb of the second region 21b of the encoder strip 21 in the scanning direction, that is, periods calculated by $Lf_1$, $Lf_2$=Wb/S.

The first reference period $Hf_n$ and the second reference period $Lf_n$ when n is larger than or equal to 3 is calculated by the following relations.

$$Hf_n = (L_{n-2} + H_{n-2}) \times D \quad (1)$$

$$Lf_n = (L_{n-2} + H_{n-1}) \times (1-D) \quad (2)$$

In the present embodiment, for example, the control device 50 measures a period from when the potential Vb of the post-correction pulse signal Rb switches to the potential V1 until when the potential Vb switches to the potential V2, thereby obtaining the duration $H_n$ and storing the obtained duration $H_n$ in the RAM 53. Similarly, in the present embodiment, for example, the control device 50 measures a period from when the potential Vb of the post-correction pulse signal Rb switches to the potential V2 until when the potential Vb switches to the potential V1, thereby obtaining the duration $L_n$ and storing the obtained duration $L_n$ in the RAM 53. In the present embodiment, the RAM 53 is an example of "buffer memory".

Further, D is the ratio of the length Wa of the first region 21a to the sum of the length Wa of the first region 21a and the length Wb of the second region 21b of the encoder strip 21 in the scanning direction (an example of "region length ratio"), that is, D is a constant calculated by D=Wa/(Wa+Wb). The value of D is preliminarily stored in the EEPROM 54. In the present embodiment, the EEPROM 54 is an example of "region-length-ratio memory".

<Comparison Between Pre-Correction Pulse Signal and Post-Correction Pulse Signal>

Next, the pre-correction pulse signal Ra and the post-correction pulse signal Rb will be described in comparison. As described above, in the pre-correction pulse signal Ra, the potential Va is V1 when the optical sensor 25 faces the first region 21a, and the potential Va is V2 when the optical sensor 25 faces the second region 21b. Hence, if a stain is not attached to the encoder strip 21, the number of times of switching of the potential Va of the pre-correction pulse signal Ra corresponds to the position of the carriage 2 in the scanning direction, and the duration of the section where the potential Va of the pre-correction pulse signal Ra is V1, V2 corresponds to the moving velocity of the carriage 2. In this case, as shown in FIG. 3, timing at which the potential switches from V1 to V2 and timing at which the potential switches from V2 to V1 are approximately the same between the pre-correction pulse signal Ra and the post-correction pulse signal Rb. Accordingly, the number of times of switching of the potential Vb of the post-correction pulse signal Rb corresponds to the position of the carriage 2 in the scanning direction, and the duration of the section where the potential Vb of the post-correction pulse signal Rb is V1, V2 corresponds to the moving velocity of the carriage 2.

<Case where Stain Adheres to Encoder Strip>

In the printer 1, sometimes a stain adheres to the encoder strip 21. For example, when ink is ejected from the nozzles 10, ink mist is generated and this mist adheres to the encoder strip 21. If a stain adheres to the second region 21b of the encoder strip 21, when the optical sensor 25 faces a portion of the second region 21b to which a stain adheres, there is a possibility that the amount of light received by the light receiving element 27 becomes smaller than the original (ideal) amount of received light, and becomes smaller than or equal to the above-mentioned threshold value. In this case, when the optical sensor 25 faces the portion of the second region 21b to which a stain adheres, the potential Va of the pre-correction pulse signal Ra becomes V1.

Figure 7:
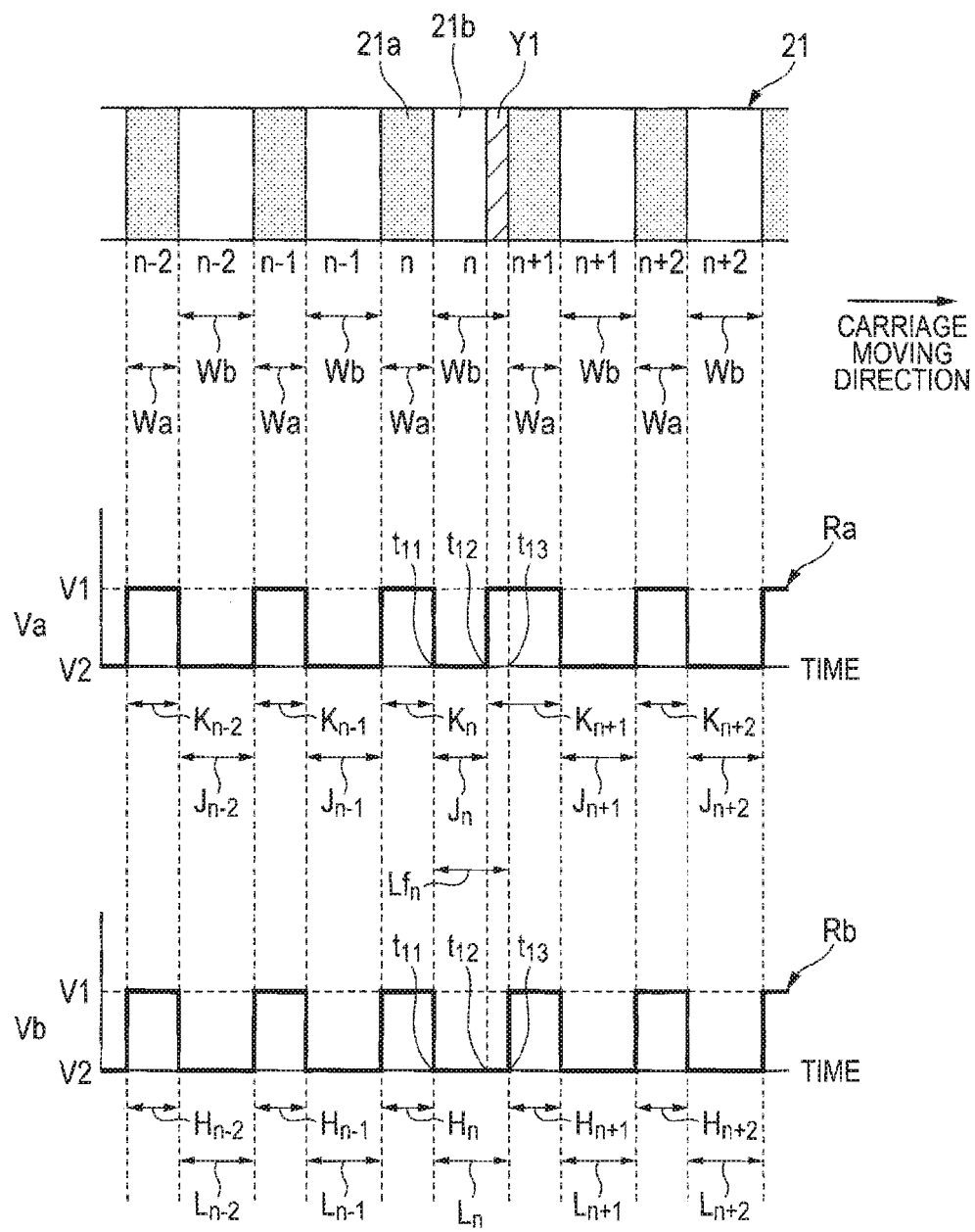
FIG. 7 is a diagram showing the pre-correction pulse signal and the post-correction pulse signal in a case where the encoder strip has a stain.

Hence, for example, as shown in FIG. 7, when a stain Y1 joining the [n+1]-th first region 21a adheres to the downstream end of the n-th second region 21b in the moving direction of the carriage 2, this shortens duration $J_n$ of the section where the potential Va of the pre-correction pulse signal Ra is V2, the section corresponding to this second region 21b. In addition, the stain Y1 increases duration $K_{n+1}$ of the subsequent section where the potential Va of the pre-correction pulse signal Ra is V1. The duration $J_n$ (n=1, 2, 3, . . . ) is duration of the section where the potential Va of the pre-correction pulse signal Ra is V2 for the n-th time. The duration $K_n$ (n=1, 2, 3, . . . ) is duration of the section where the potential Va of the pre-correction pulse signal Ra is V1 for the n-th time.

Figure 8:
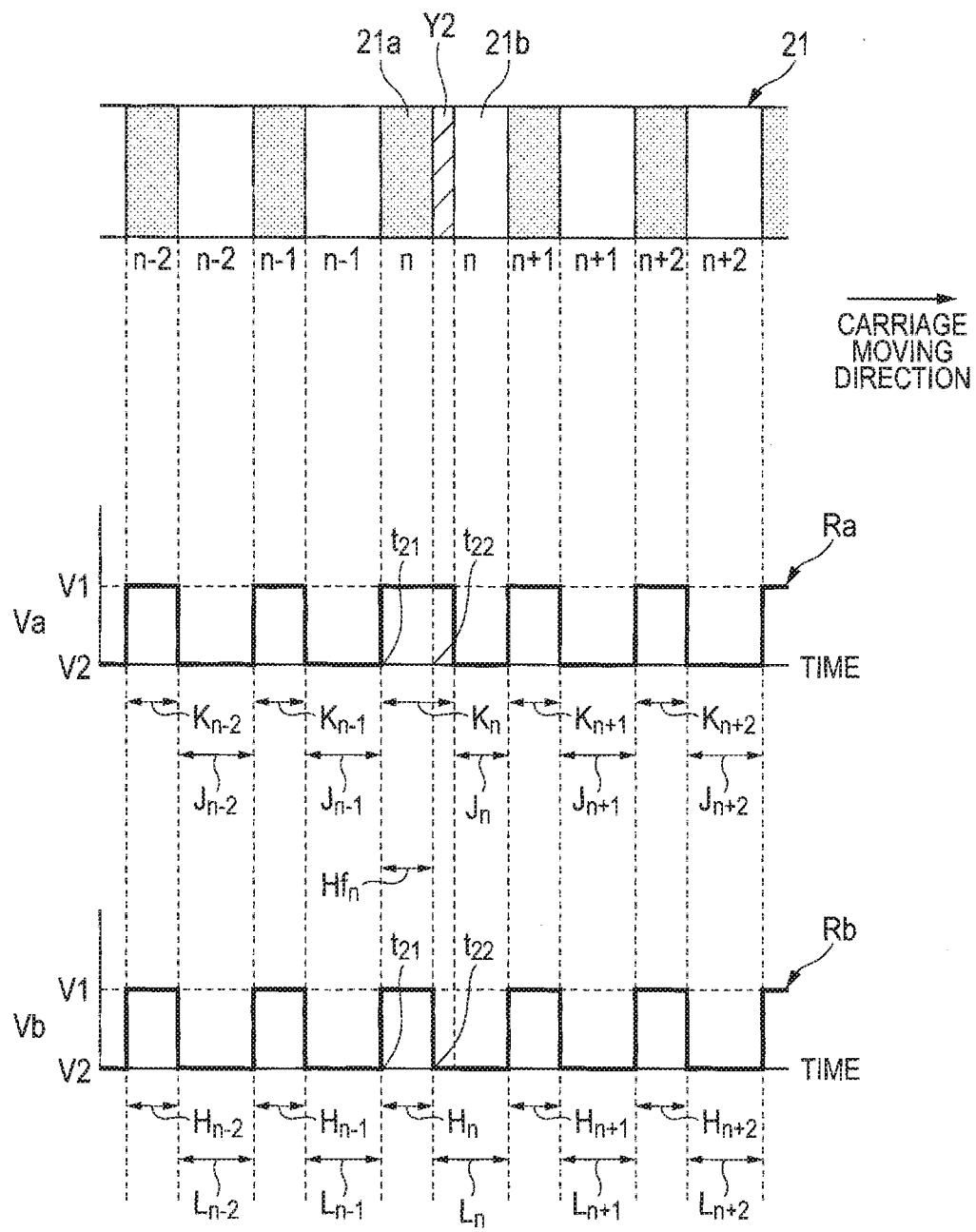
FIG. 8 is a diagram showing the pre-correction pulse signal and the post-correction pulse signal in a case where the encoder strip has a stain different from FIG. 7.

For example, as shown in FIG. 8, when a stain Y2 joining the n-th first region 21a adheres to the upstream end of the n-th second region 21b in the moving direction of the carriage 2, this shortens duration $J_n$ of the section where the potential Va of the pre-correction pulse signal Ra is V2 for the n-th time, the section corresponding to this second region 21b. In addition, the stain Y2 increases duration $K_n$ of the preceding section where the potential Va of the pre-correction pulse signal Ra is V1 for the n-th time.

Figure 9:
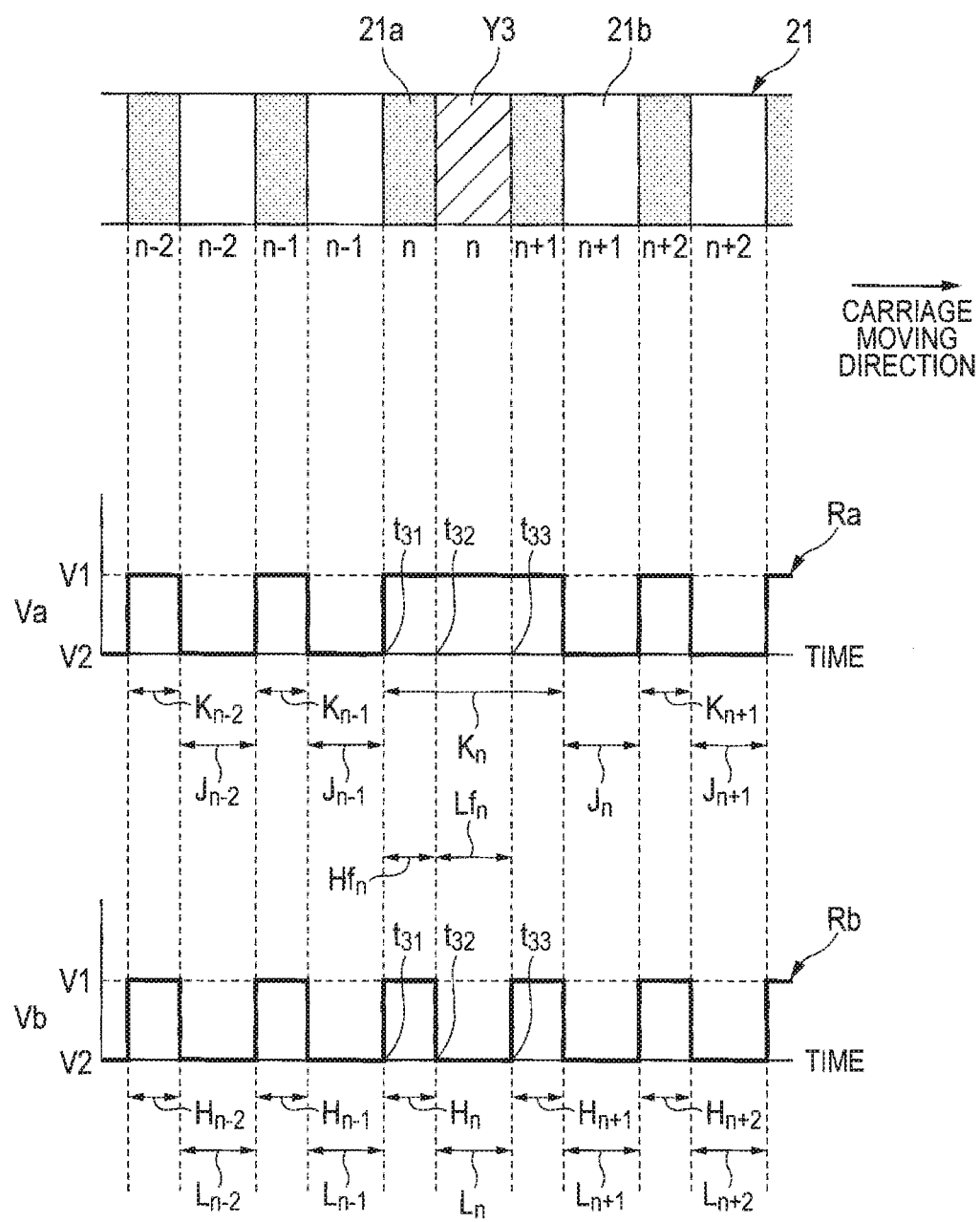
FIG. 9 is a diagram showing the pre-correction pulse signal and the post-correction pulse signal in a case where the encoder strip has a stain different from FIGS. 7 and 8.

Further, for example, as shown in FIG. 9, when a stain Y3 adheres to an entirety of the n-th second region 21b in the moving direction of the carriage 2, the potential of the pre-correction pulse signal Ra is maintained at V1 while the optical sensor 25 faces the section corresponding to the second region 21b and the two first regions 21a adjacent to that second region 21b at the both sides.

Hence, in these cases, the moving velocity of the carriage 2 cannot be detected accurately based on the pre-correction pulse signal Ra. Further, when the above-mentioned stain Y3 adheres, the number of times of switching of the potential Va of the pre-correction pulse signal Ra decreases. Hence, the position of the carriage 2 in the scanning direction cannot be detected accurately based on the pre-correction pulse signal Ra, either.

When a stain adheres to the second region 21b, the duration of the section where the potential Va of the pre-correction pulse signal is V1 increases, and the duration of the section where the potential Va is V2 decreases. On the other hand, when a stain adheres to the first region 21a, the amount of light received by the light receiving element 27 does not increase. Thus, in the present embodiment, as described above, (a) when the potential Va of the pre-correction pulse signal Ra switches from V1 to V2 (S305: YES), or (b) when the duration $H_n$ of the section where the potential Vb of the post-correction pulse signal Rb is V1 exceeds the first reference period $Hf_n$ (S306: YES), the control device 50 switches the potential Vb of the post-correction pulse signal Rb from V1 to V2 (S307).

Further, it cannot be determined only based on the fact that the potential Va of the pre-correction pulse signal Ra switches from V2 to V1, whether the light emitting element 26 and the light receiving element 27 reaches a position facing the first region 21a, or reaches a position facing a portion of the second region 21b to which a stain adheres. On the other hand, the duration $L_n$ of the section where the potential Va of the pre-correction pulse signal Ra is V2 does not increase due to the fact that a stain adheres to the encoder strip 21. Thus, in the present embodiment, (c) when the duration $L_n$ of the section where the potential Vb of the post-correction pulse signal Rb is V2 exceeds the second reference period $Lf_n$ (S309: YES) and (d) the potential Va of the pre-correction pulse signal Ra is V1 (S310: YES), the control device 50 switches the potential Vb of the post-correction pulse signal Rb from V2 to V1 (S311).

As described above, by switching the potential Vb of the post-correction pulse signal Rb between V1 and V2, compared with the pre-correction pulse signal Ra, the post-correction pulse signal Rb accurately indicates whether the optical sensor 25 faces the first region 21a or the second region 21b. Accordingly, the moving velocity and the position of the carriage 2 in the scanning direction can be calculated accurately based on the post-correction pulse signal Rb.

As shown in FIGS. 7 to 9, the timing at which the potential Vb of the post-correction pulse signal Rb changes will be described by taking as examples where the stains Y1 to Y3 adhere to the encoder strip 21.

As shown in FIG. 7, when the stain Y1 adheres to the n-th second region 21b in the moving direction of the carriage 2, at time $t_{12}$ at which duration $J_n$ has elapsed from start time $t_{11}$, the second reference period $Lf_n$ has not elapsed from time $t_{11}$ (S309: NO). The start time $t_{11}$ is start time of the section where the potential Va of the pre-correction pulse signal Ra and the potential Vb of the post-correction pulse signal Rb are V2 for the n-th time. The duration $J_n$ is duration of the section where the potential Va of the pre-correction pulse signal Ra is V2 for the n-th time. Hence, the potential Vb of the post-correction pulse signal Rb does not switch from V2 to V1 at time $t_{12}$, and switches from V2 to V1 (S311) at time $t_{13}$ at which the second reference period $Lf_n$ has elapsed from time $t_{11}$ (S309: YES, S310: YES). That is, the duration $L_n$ of the section where the potential Vb of the post-correction pulse signal Rb is V2 for the n-th time has the same length as the second reference period $Lf_n$. Thus, the duration $L_n$ is approximately the same as the case where the stain Y1 is not attached. This suppresses fluctuations of the duration $L_n$ of the section where the potential Vb of the post-correction pulse signal Rb is V2 for the n-th time, and the duration $H_{n+1}$ of the subsequent section where the potential Vb of the post-correction pulse signal Rb is V1 for the [n+1]-th time, due to the stain Y1.

As shown in FIG. 8, when the stain Y2 adheres to the n-th second region 21b in the moving direction of the carriage 2, the potential Va of the pre-correction pulse signal Ra does not switch from V1 to V2 (S305: NO) before the first reference period $Hf_n$ elapses from start time $t_{21}$ of the section where the potential Va of the pre-correction pulse signal Ra and the potential Vb of the post-correction pulse signal Rb are V1 for the n-th time. At time $t_{22}$ at which the first reference period $Hf_n$ has elapsed from time $t_{21}$ (S306: YES), the potential Vb of the post-correction pulse signal Rb switches from V1 to V2 (S307). That is, the duration $H_n$ of the section where the potential Vb of the post-correction pulse signal Rb, corresponding to the n-th first region 21a from the left side, is V1 is the same as the first reference period $Hf_n$. Thus, the duration $H_n$ is approximately the same as the case where the stain Y2 is not attached. This suppresses fluctuations of the duration $H_n$ of the section where the potential Vb of the post-correction pulse signal Rb is V1 for the n-th time, and the duration $L_n$ of the immediately subsequent section where the potential Vb of the post-correction pulse signal Rb is V2 for the n-th time, due to the stain Y2.

As shown in FIG. 9, when the stain Y3 adheres to the entirety of the n-th second region 21b in the moving direction of the carriage 2, the potential Va of the pre-correction pulse signal Ra does not switch from V1 to V2 before the first reference period $Hf_n$ elapses from start time $t_{31}$ of the section where the potential Va of the pre-correction pulse signal Ra and the potential Vb of the post-correction pulse signal Rb are V1 for the n-th time (S305: NO). At time $t_{32}$ at which the first reference period $Hf_n$ has elapsed from time $t_{31}$ (S306: YES), the potential Vb of the post-correction pulse signal Rb switches from V1 to V2 (S307). That is, the duration $H_n$ of the section where the potential Vb of the post-correction pulse signal Rb is V1 for the n-th time is the same as the first reference period $Hf_n$.

Further, the potential Va of the pre-correction pulse signal Ra is maintained at V1 until the second reference period $Lf_n$ elapses from time $t_{32}$. Hence, at time $t_{33}$ at which the second reference period $Lf_n$ has elapsed from time $t_{32}$ (S309: YES, S310: YES), the potential Vb of the post-correction pulse signal Rb switches from V2 to V1. That is, the duration $L_n$ of the section where the potential Vb of the post-correction pulse signal Rb is V2 for the n-th time is the same as the second reference period $Lf_n$.

These features suppress fluctuation, due to the stain Y3, of the duration $L_n$ of the section where the potential Vb of the post-correction pulse signal Rb is V2 for the n-th time, and the durations $H_n$, $H_{n+1}$ of the preceding and subsequent sections where the potential Vb of the post-correction pulse signal Rb is V1 for the n-th time or the [n+1]-th time.

<Case where Moving Velocity of Carriage Changes>

In addition to a case where a stain adheres to the encoder strip 21, when the moving velocity of the carriage 2 has changed, too, the duration $K_n$ of the section where the potential Va of the pre-correction pulse signal Ra is V1 and the duration $J_n$ of the section where the potential Va is V2 change. When a stain adheres to the encoder strip 21, as described above, the duration $K_n$ of the section where the potential Va of the pre-correction pulse signal Ra is V1 increases, and the duration $J_n$ of the section where the potential Va is V2 decreases. On the other hand, when the moving velocity of the carriage 2 has increased, both of the duration $K_n$ of the section where the potential Va of the pre-correction pulse signal Ra is V1 and the duration $J_n$ of the section where the potential Va is V2 decrease. When the moving velocity of the carriage 2 has decreased, both of the duration $K_n$ of the section where the potential Va of the pre-correction pulse signal Ra is V1 and the duration $J_n$ of the section where the potential Va is V2 increase.

In this way, the duration $K_n$ of the section where the potential Va of the pre-correction pulse signal Ra is V1 and the duration $J_n$ of the section where the potential Va is V2 change in different manners between a case where a stain adheres to the encoder strip 21 and a case where the moving velocity of the carriage 2 has changed. As described above, the potential Vb of the post-correction pulse signal Rb is switched from V1 to V2 when the condition (a) or (b) is satisfied, and is switched from V2 to V1 when the both conditions (c) and (d) are satisfied. Due to this operation, when the moving velocity of the carriage 2 has changed, a difference between the timing at which the potential Vb of the post-correction pulse signal Rb switches and the timing at which the potential Va of the pre-correction pulse signal Ra switches, can be reduced.

Figure 10:
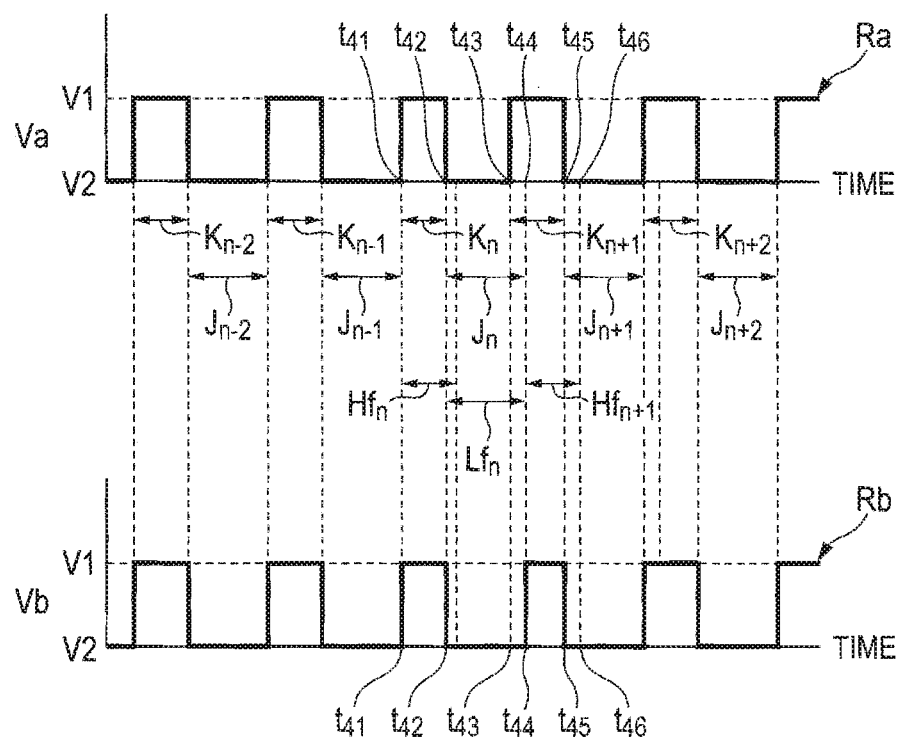
FIG. 10 is a diagram showing the pre-correction pulse signal and the post-correction pulse signal in a case where the moving velocity of the carriage is temporarily increased.

Specifically, for example, assume that the moving velocity of the carriage 2 has temporarily increased and, as shown in FIG. 10, the duration $K_n$ of the section where the potential Va of the pre-correction pulse signal Ra is V1 for the n-th time and the duration $J_n$ of the subsequent section where the potential Va is V2 for the n-th time are shortened. In this case, because the duration $K_n$ is shortened, the first reference period $Hf_n$ calculated from the above-mentioned relation (1) is longer than the duration $K_n$. At time $t_{42}$ at which the duration $K_n$ has elapsed from start time $t_{41}$ of the section where the potential Vb is V1 for the n-th time (S305: YES), the potential Vb of the post-correction pulse signal Rb switches from V1 to V2 (S307). Thus, the section where the potential Va of the pre-correction pulse signal Ra is V2 for the n-th time and the section where the potential Vb of the post-correction pulse signal Rb is V2 for the n-th time have the same start time which is time $t_{42}$.

Further, because the duration is shortened, the second reference period $Lf_n$ calculated from the above-mentioned relation (2) is longer than the duration $J_n$. Hence, at end time $t_{43}$ of the section where the potential Va of the pre-correction pulse signal Ra is V2 for the n-th time, the second reference period $Lf_n$ has not elapsed from time $t_{42}$ (S309: NO). Accordingly, the potential Vb of the post-correction pulse signal Rb does not switch from V2 to V1 at time $t_{43}$, and switches from V2 to V1 (S311) at time $t_{44}$ at which the second reference period $Lf_n$ has elapsed from time $t_{42}$ (S309: YES, S310: YES). Thus, the duration $L_n$ of the section where the potential Vb of the post-correction pulse signal Rb is V2 for the n-th time is the same as the second reference period $Lf_n$. In this case, time $t_{44}$ is behind time $t_{43}$.

Further, the potential Va of the pre-correction pulse signal Ra switches from V1 to V2 at time $t_{45}$ at which the duration $K_{n+1}$ has elapsed from time $t_{43}$ (S305: YES). Because time $t_{44}$ is behind time $t_{43}$, time $t_{46}$ at which the first reference period $Hf_{n+1}$ has elapsed from time $t_{44}$ is after time $t_{45}$. Hence, the potential Vb of the post-correction pulse signal Rb switches from V1 to V2 at time $t_{45}$. Thus, the section where the potential Va of the pre-correction pulse signal Ra is V2 for the [n+1]-th time and the section where the potential Vb of the post-correction pulse signal Rb is V2 for the [n+1]-th time have the same start time which is time $t_{45}$.

To summarize the above, in the above-described cases, end time $t_{44}$ of the section where the potential Vb of the post-correction pulse signal Rb is V2 for the n-th time is shifted from end time $t_{43}$ of the section where the potential Va of the pre-correction pulse signal Ra is V2 for the n-th time. However, the start time of these two sections is the same time $t_{42}$. Further, the start time of the section where the potential Vb of the post-correction pulse signal Rb is V2 for the [n+1]-th time and the start time of the section where the potential Va of the pre-correction pulse signal Ra is V2 for the [n+1]-th time are the same time $t_{45}$. This suppresses a difference between the timing at which the potential Vb of the post-correction pulse signal Rb switches and the timing at which the potential Va of the pre-correction pulse signal Ra switches, when the moving velocity of the carriage 2 has increased.

Figure 11:
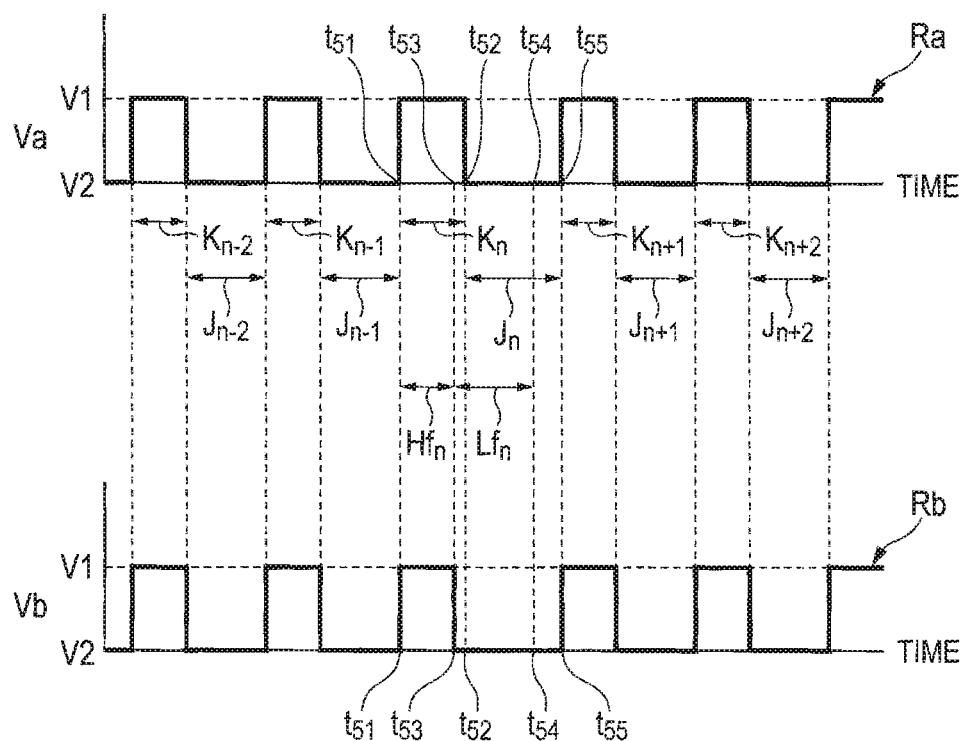
FIG. 11 is a diagram showing the pre-correction pulse signal and the post-correction pulse signal in a case where the moving velocity of the carriage is temporarily decreased.

Conversely, for example, assume that the moving velocity of the carriage 2 has temporarily decreased and, as shown in FIG. 11, the duration $K_n$ of the section where the potential Va of the pre-correction pulse signal Ra is V1 for the n-th time and the duration $J_n$ of the subsequent section where the potential Va is V2 are increased. In this case, because the duration $K_n$ is increased, the first reference period $Hf_n$ calculated from the above-mentioned relation (1) is shorter than the duration $K_n$. Hence, in the post-correction pulse signal Rb, the first reference period $Hf_n$ elapses from time $t_{51}$, before time $t_{52}$ at which duration $K_n$ has elapsed from start time $t_{51}$ of the section where the potential Vb is V1 for the n-th time (S306:YES). Accordingly, the potential Vb of the post-correction pulse signal Rb switches from V1 to V2 at time $t_{53}$ at which the first reference period $Hf_n$ has elapsed from time $t_{51}$ (S307). Hence, time $t_{53}$ is before time $t_{52}$.

Further, because the duration $J_n$ has become longer, the second reference period $Lf_n$ calculated from the above-mentioned relation (2) is shorter than the duration $J_n$. In addition, as mentioned above, start time $t_{53}$ of the section where the potential Vb of the post-correction pulse signal Rb is V2 for the n-th time is before start time $t_{52}$ of the section where the potential Va of the pre-correction pulse signal Ra is V2 for the n-th time. Accordingly, time $t_{54}$ at which the second reference period $Lf_n$ has elapsed from time $t_{53}$ is before time $t_{55}$ at which the duration $J_n$ has elapsed from time $t_{52}$. Thus, the potential Vb of the post-correction pulse signal Rb does not switch from V2 to V1 at time $t_{54}$ (S310: NO), and switches from V2 to V1 at time $t_{55}$ after that (S309: YES, S310: YES) (S311). That is, the end time of the section where the potential Va of the pre-correction pulse signal Ra is V2 for the n-th time and the end time of the section where the potential Vb of the post-correction pulse signal Rb is V2 for the n-th time are the same time $t_{55}$.

To summarize the above, start time $t_{53}$ of the section where the potential Vb of the post-correction pulse signal Rb is V2 for the n-th time is shifted from start time $t_{52}$ of the section where the potential Va of the pre-correction pulse signal Ra is V2 for the n-th time. However, the end time of these two sections is the same time $t_{55}$. This suppresses a difference between the timing at which the potential Vb of the post-correction pulse signal Rb switches and the timing at which the potential Va of the pre-correction pulse signal Ra switches, when the moving velocity of the carriage 2 has decreased.

When the pre-correction pulse signal Ra is corrected as described above, in a case where a stain adheres only to a part of a certain second region 21b of the encoder strip 21, like the stains Y1 and Y2 do, the sum of the number of sections where the potential Vb is V1 and the number of sections where the potential Vb is V2 in the post-correction pulse signal Rb is the same as the sum of the number of sections where the potential Va is V1 and the number of sections where the potential Va is V2 in the pre-correction pulse signal Ra. On the other hand, in a case where a stain adheres to the entirety of a certain second region 21b of the encoder strip 21, like the stain Y3 does, the sum of the number of sections where the potential Vb is V1 and the number of sections where the potential Vb is V2 in the post-correction pulse signal Rb is larger than the sum of the number of sections where the potential Va is V1 and the number of sections where the potential Va is V2 in the pre-correction pulse signal Ra. That is, the sum of the number of sections where the potential Vb is V1 and the number of sections where the potential Vb is V2 in the post-correction pulse signal Rb is larger than or equal to the sum of the number of sections where the potential Va is V1 and the number of sections where the potential Va is V2 in the pre-correction pulse signal Ra.

Figure 12:
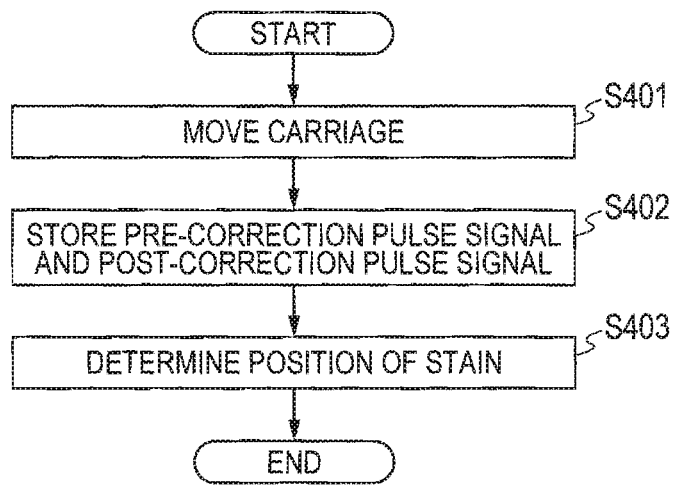
FIG. 12 is a flowchart showing the flow of a stain-position determining process.

In the printer 1, in addition to printing on recording paper P, the control device 50 performs a stain-position determining process of determining to which part of the encoder strip 21a stain adheres. In the stain-position determining process, as shown in FIG. 12, the control device 50 moves the carriage 2 in the scanning direction (S401), and stores the pre-correction pulse signal Ra and the post-correction pulse signal Rb at that time in the EEPROM 54 or the like (S402). And, the control device 50 determines to which second region 21b of the encoder strip 21a stain adheres, based on a difference of timing of switching from V1 to V2 between the potential Va of the pre-correction pulse signal Ra and the potential Vb of the post-correction pulse signal Rb, a difference of timing of switching from V2 to V1 between the potential Va of the pre-correction pulse signal Ra and the potential Vb of the post-correction pulse signal Rb, and so on, stored in the EEPROM 54 (S403).

While the disclosure has been described in detail with reference to the above aspects thereof, it would be apparent to those skilled in the art that various changes and modifications may be made therein without departing from the scope of the claims.

Figure 13:
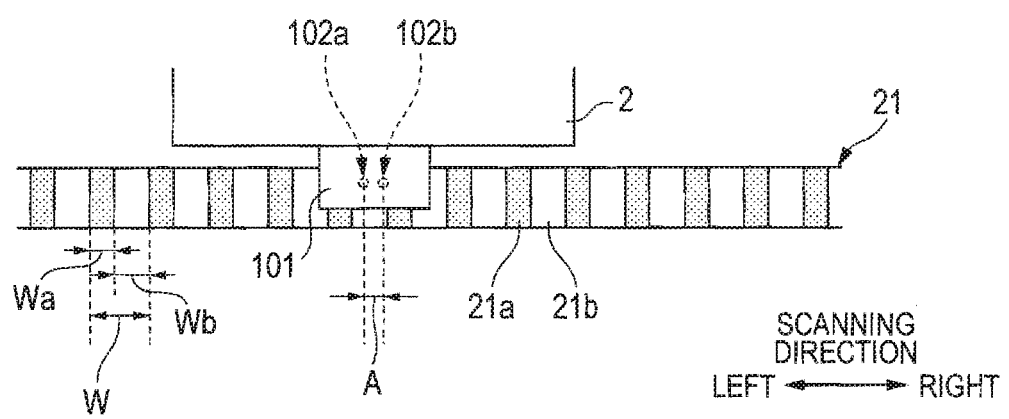
FIG. 13 is a diagram corresponding to FIG. 2A, according to a first modification.

In the above-described embodiment, the encoder sensor 22 includes a single optical sensor 25. However, the number of optical sensors is not limited to one. In a first modification, as shown in FIG. 13, an encoder sensor 101 includes two optical sensors 102a, 102b. Each of the optical sensors 102a, 102b has the light emitting element 26 and the light receiving element 27 (see FIG. 2B) as in the optical sensor 25. The optical sensor 102a and the optical sensor 102b are arranged with an interval A in the scanning direction, and the optical sensor 102b is located at the right side of the optical sensor 102a. The interval A is shorter than the arrangement cycle W (=Wa+Wb) of the first region 21a and the second region 21b in the encoder strip 21 (for example, approximately W/4). The control device 50 corrects the pre-correction pulse signal Ra outputted from the light receiving element 27 of each of these two optical sensors 102a, 102b by performing processes in accordance with the flowchart of FIG. 6 in a similar manner to the above-described embodiment, and outputs signals as the post-correction pulse signal Rb.

Figure 14A:
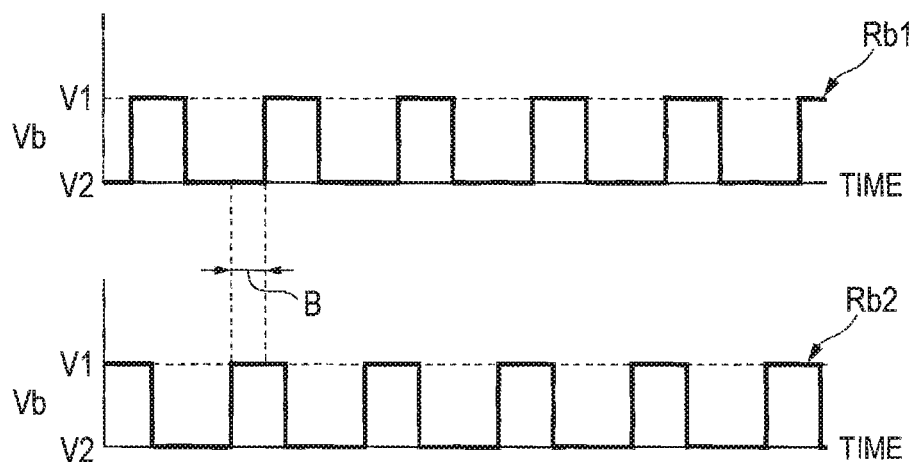
FIG. 14A is a diagram showing the post-correction pulse signal outputted from two optical sensors when the carriage moves rightward in the first modification.
Figure 14B:
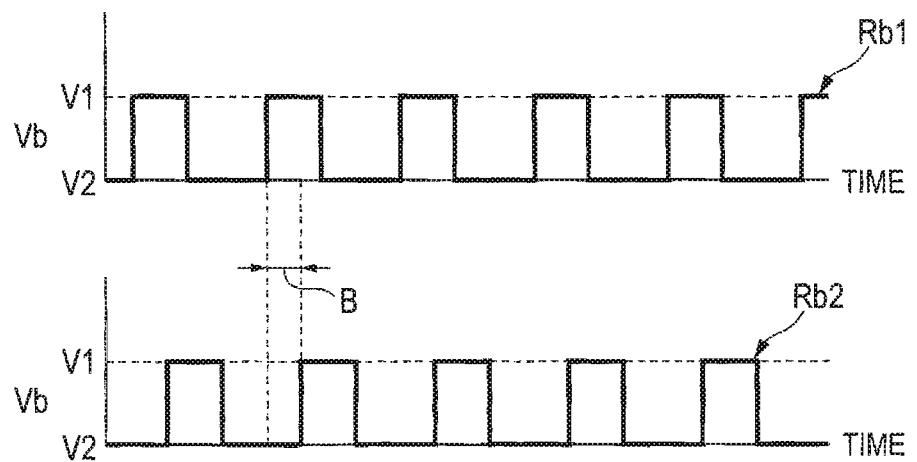
FIG. 14B is a diagram showing the post-correction pulse signal outputted from two optical sensors when the carriage moves leftward in the first modification.

It is assumed that Rb1 is the post-correction pulse signal Rb corresponding to the optical sensor 102a and that Rb2 is the post-correction pulse signal Rb corresponding to the optical sensor 102b. When the carriage 2 is moving rightward, as shown in FIG. 14A, the post-correction pulse signal Rb1 is behind the post-correction pulse signal Rb2 by a period B. On the other hand, when the carriage 2 is moving leftward, as shown in FIG. 14B, the post-correction pulse signal Rb2 is behind the post-correction pulse signal Rb1 by the period B. Accordingly, in the first modification, the moving direction of the carriage 2 can be detected from the post-correction pulse signal Rb1 and the post-correction pulse signal Rb2. The period B is represented as B=A/S when S is the moving velocity of the carriage 2.

In the first modification, the two pre-correction pulse signals outputted from the light receiving element 27 of the optical sensors 102a, 102b are corrected by the same process and outputted as the post-correction pulse signals. Hence, although the encoder sensor 101 includes the optical sensors 102a, 102b, the process of correcting the pre-correction pulse signal does not become complicated.

In the first modification, the interval A between the optical sensor 102a and the optical sensor 102b is smaller than the arrangement cycle W of the first regions 21a and the second regions 21b in the encoder strip 21. However, the interval A between the optical sensor 102a and the optical sensor 102b may be larger than the arrangement cycle W, as long as the interval A is different from an integral multiple of the arrangement cycle W of the first regions 21a and the second regions 21b in the encoder strip 21.

In the above-described embodiment, the first and second reference periods $Hf_n$, $Lf_n$ are calculated by using the above-mentioned relations (1), (2). However, the first and second reference periods $Hf_n$, $Lf_n$ may be calculated by using durations of earlier sections where the potential Vb of the post-correction pulse signal Rb is V1, V2. For example, the first and second reference periods $Hf_n$, $Lf_n$ may be calculated by using relations (3), (4) shown below.

$$Hf_n = (L_{n-3} + H_{n-3}) \times D \quad (3)$$

$$Lf_n = (L_{n-3} + H_{n-2}) \times (1-D) \quad (4)$$

However, if the first and second reference periods $Hf_n$, $Lf_n$ are calculated by using durations of too earlier sections where the potential Vb of the post-correction pulse signal Rb is V1, V2, there is a possibility that the first and second reference periods $Hf_n$, $Lf_n$, are not calculated appropriately. Hence, it is preferable that the first and second reference periods $Hf_n$, $Lf_n$ be calculated by using durations of relatively new sections where the potential Vb of the post-correction pulse signal Rb is V1, V2 such that the calculated values are appropriate. For example, it is preferable that the first and second reference periods $Hf_n$, $Lf_n$ be calculated by using durations of sections where the potential Vb of the post-correction pulse signal Rb is V1, V2 for the [n−5]-th time or durations of newer (later) sections. For example, the first and second reference periods $Hf_n$, $Lf_n$ may be calculated by using durations of the immediately preceding sections where the potential Vb of the post-correction pulse signal Rb is V1, V2 by using the relations $Hf_n = (L_{n-1} + H_{n-1}) \times D$ and $Lf_n = (L_{n-1} + H_n) \times (1-D)$.

In the above-described embodiment, each of the first and second reference periods $Hf_n$, $Lf_n$ is calculated by using durations of a past one set of sections where the potential Vb of the post-correction pulse signal Rb is V1, V2. However, each of the first and second reference periods $Hf_n$, $Lf_n$ may be calculated by using durations of a past plurality of sets of sections where the potential Vb of the post-correction pulse signal Rb is V1, V2. For example, the first and second reference periods $Hf_n$, $Lf_n$ may be calculated by using an average value of durations of a past plurality of sections where the potential Vb of the post-correction pulse signal Rb is V1 and an average value of durations of a past plurality of sections where the potential Vb of the post-correction pulse signal Rb is V2.

Alternatively, the EEPROM 54 may preliminarily store the first reference period $Hf_n$ and the second reference period $Lf_n$ for all n, individually, and the first reference period $Hf_n$ and the second reference period $Lf_n$ may be read out from the EEPROM 54 in S306 and S309. This modification would be suitable for a small-size printer in which printing is performed in the region where the carriage accelerates or decelerates as well as in the region where the carriage moves at constant velocity. Alternatively, the EEPROM 54 may store a common first reference period and a common second reference period, and this first reference period and second reference period may be read out from the EEPROM 54 in S306 and S309 regardless of the value of n. This modification would be suitable for a printer in which printing is performed only in the region where the carriage moves at constant velocity and printing is not performed in the region where the carriage accelerates or decelerates. In these cases, it is not necessary to store, in the RAM 53, the duration $H_n$ of the section where the potential Vb of the post-correction pulse signal Rb is V1 and the duration $L_n$ of the section where the potential Vb is V2.

Figure 15A:
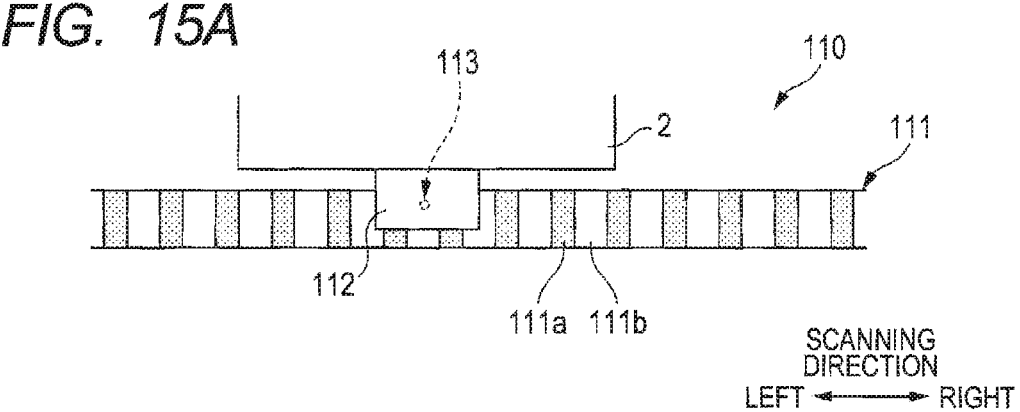
FIG. 15A is a diagram corresponding to FIG. 2A, according to a second modification.
Figure 15B:
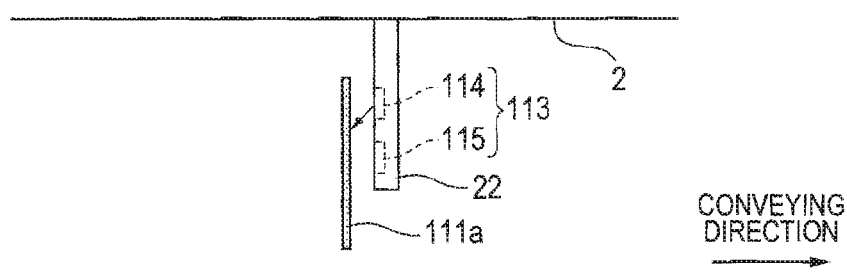
FIG. 15B is a diagram corresponding to FIG. 2B, according to the second modification.
Figure 15C:
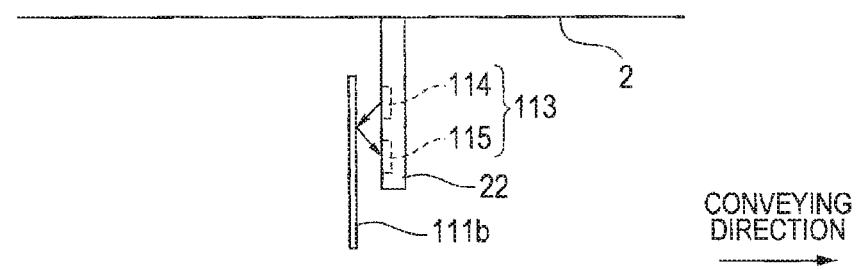
FIG. 15C is a diagram corresponding to FIG. 2C, according to the second modification.

In the above-described embodiment, the linear encoder 5 is a so-called transmissive type. However, the linear encoder may be a so-called reflective type. For example, in a second modification, as shown in FIGS. 15A to 15C, a linear encoder 110 includes an encoder strip 111 and an encoder sensor 112. The encoder strip 111 has a plurality of first regions 111a and a plurality of second regions 111b arranged cyclically in the scanning direction. The first regions 111a are regions configured not to reflect light, and the second region 111b are regions configured to reflect light. The encoder sensor 112 includes an optical sensor 113 having a light emitting element 114 and a light receiving element 115. Both of the light emitting element 114 and the light receiving element 115 are arranged at the downstream side of the encoder strip 111 in the conveying direction.

As shown in FIG. 15B, when the optical sensor 113 faces the first region 111a, light emitted from the light emitting element 114 is not reflected by the first region 111a, and the light receiving element 115 does not receive light emitted from the light emitting element 114. In contrast, as shown in FIG. 15C, when the optical sensor 113 faces the second region 111b, light emitted from the light emitting element 114 is reflected by the second region 111b, and the light receiving element 115 receives light emitted from the light emitting element 114. That is, the amount of light received by the light receiving element 115 is larger when the optical sensor 113 faces the second region 111b than when the optical sensor 113 faces the first region 111a.

In the above-described embodiment, the pre-correction pulse signal Ra is a pulse signal that the potential Va switches between V1 and V2, whereas the post-correction pulse signal Rb is also a pulse signal that the potential Vb switches between V1 and V2. However, the post-correction pulse signal Rb may be a pulse signal that the potential Vb switches between two potentials different from ones in the above embodiment. For example, the post-correction pulse signal Rb may be a pulse signal that the potential Vb switches between V3 (an example of "third level") different from any one of V1, V2 and V4 (an example of "fourth level") different from any one of V1, V2, V3. Alternatively, the post-correction pulse signal Rb may be a pulse signal that the potential Vb switches between V1 (an example of "third level") and V4 (an example of "fourth level"). Alternatively, the post-correction pulse signal Rb may be a pulse signal that the potential Vb switches between V3 (an example of "third level") and V2 (an example of "fourth level"). In these cases, potential V3 may be higher than potential V4, or potential V4 may be higher than potential V3. In the above-described embodiment, potential V1 is higher than potential V2. However, potential V1 may be lower than potential V2.

In the above-described embodiment, the pre-correction pulse signal Ra is a pulse signal that the potential Va switches between V1 and V2, and potential V2 is lower than potential V1. However, potential V2 may be higher than potential V1.

In the above descriptions, the present disclosure is applied to a printer that performs printing by ejecting ink from nozzles. However, the present disclosure may be applied to a liquid ejecting apparatus that ejects liquid other than ink. In addition, the present disclosure may be applied to a velocity detecting apparatus provided in an apparatus other than a liquid ejecting apparatus.

What is claimed is:

1. A velocity detecting apparatus comprising:
a region formation member having a first region and a second region that are arranged cyclically in a particular direction, the first region and the second region having different optical characteristics from each other;
an optical sensor configured to emit light to the region formation member and to output a pre-correction pulse signal that is on a first level when facing the first region and that is on a second level when facing the second region, the second level being different from the first level, the optical characteristics of the first region and the second region being such that the optical sensor receives a larger amount of light from the second region than from the first region;
a moving device configured to move the optical sensor and the region formation member relative to each other in the particular direction; and
a controller configured to control the optical sensor and the moving device, the controller being configured to perform:
correcting the pre-correction pulse signal outputted from the optical sensor and outputting the corrected pre-correction pulse signal as a post-correction pulse signal that switches between a third level and a fourth level different from each other, the correcting comprising:
switching the post-correction pulse signal from the third level to the fourth level when at least one of a first condition and a second condition is satisfied, the first condition being that the pre-correction pulse signal switches from the first level to the second level, the second condition being that duration of a section in which the post-correction pulse signal is on the third level exceeds a first reference period; and
switching the post-correction pulse signal from the fourth level to the third level when both of a third condition and a fourth condition are satisfied, the third condition being that duration of a section in which the post-correction pulse signal is on the fourth level exceeds a second reference period, the fourth condition being that the pre-correction pulse signal is on the first level; and
calculating a relative moving velocity of the moving device based on temporal changes between the third level and the fourth level of the post-correction pulse signal.

2. The velocity detecting apparatus according to claim 1, further comprising:
a region-length-ratio memory configured to store a region length ratio that is a ratio of lengths of the first region and the second region in the particular direction; and
a buffer memory configured to store duration information indicative of duration of at least past one set of a section in which the post-correction pulse signal is on the third level and a section in which the post-correction pulse signal is on the fourth level,
wherein the controller is configured to calculate the first reference period and the second reference period based on the region length ratio stored in the region-length-ratio memory and on the duration information stored in the buffer memory.

3. The velocity detecting apparatus according to claim 1, wherein a sum of a number of sections in which the post-correction pulse signal is on the third level and a number of sections in which the post-correction pulse signal is on the fourth level is larger than or equal to a sum of a number of sections in which the pre-correction pulse signal is on the first level and a number of sections in which the pre-correction pulse signal is on the second level.

4. The velocity detecting apparatus according to claim 1, wherein the optical sensor comprises two optical sensors that are spaced away from each other by a length in the particular direction, the length being different from a natural number times an arrangement cycle with which the first region and the second region are arranged cyclically; and
wherein the controller is configured to output the post-correction pulse signal from each of pre-correction pulse signals outputted from the two optical sensors.

5. The velocity detecting apparatus according to claim 1, wherein the controller is configured to detect a position on the region formation member to which a stain adheres, by comparing the pre-correction pulse signal and the post-correction pulse signal.

6. The velocity detecting apparatus according to claim 1, wherein the first level is same as the third level; and
wherein the second level is same as the fourth level.

7. The velocity detecting apparatus according to claim 1, wherein the first level and the third level are high levels; and
wherein the second level and the fourth level are low levels that are lower than the high levels.

8. The velocity detecting apparatus according to claim 1, wherein the controller is configured to control moving velocity of the moving device based on the calculated relative moving velocity of the moving device.

9. The velocity detecting apparatus according to claim 1, further comprising:
a reference-period memory configured to individually store the first reference period and the second reference period for all of the first region and the second region of the region formation member,
wherein the controller is configured to read out the first reference period and the second reference period from the reference-period memory, in correcting the pre-correction pulse signal.

10. A liquid ejecting apparatus comprising:
a carriage configured to move reciprocatingly in a scanning direction;
a liquid ejecting head mounted on the carriage, the liquid ejecting head being formed with nozzles and configured to eject liquid from the nozzles; and
a velocity detecting apparatus configured to detect velocity of the carriage, the velocity detecting apparatus comprising:
a region formation member having a first region and a second region that are arranged cyclically in the scanning direction, the first region and the second region having different optical characteristics from each other;
an optical sensor disposed on the carriage, the optical sensor being configured to emit light to the region formation member and to output a pre-correction pulse signal that is on a first level when facing the first region and that is on a second level when facing the second region, the second level being different from the first level, the optical characteristics of the first region and the second region being such that the optical sensor receives a larger amount of light from the second region than from the first region; and a controller configured to control the optical sensor and the carriage, the controller being configured to perform:
  correcting the pre-correction pulse signal outputted from the optical sensor and outputting the corrected pre-correction pulse signal as a post-correction pulse signal that switches between a third level and a fourth level different from each other, the correcting comprising:
    switching the post-correction pulse signal from the third level to the fourth level when at least one of a first condition and a second condition is satisfied, the first condition being that the pre-correction pulse signal switches from the first level to the second level, the second condition being that duration of a section in which the post-correction pulse signal is on the third level exceeds a first reference period; and
    switching the post-correction pulse signal from the fourth level to the third level when both of a third condition and a fourth condition are satisfied, the third condition being that duration of a section in which the post-correction pulse signal is on the fourth level exceeds a second reference period, the fourth condition being that the pre-correction pulse signal is on the first level; and
  calculating a moving velocity of the carriage based on temporal changes between the third level and the fourth level of the post-correction pulse signal.

11. The liquid ejecting apparatus according to claim 10, further comprising:
  a region-length-ratio memory configured to store a region length ratio that is a ratio of lengths of the first region and the second region in the scanning direction; and
  a buffer memory configured to store duration information indicative of duration of at least past one set of a section in which the post-correction pulse signal is on the third level and a section in which the post-correction pulse signal is on the fourth level,
  wherein the controller is configured to calculate the first reference period and the second reference period based on the region length ratio stored in the region-length-ratio memory and on the duration information stored in the buffer memory.

12. The liquid ejecting apparatus according to claim 10, wherein a sum of a number of sections in which the post-correction pulse signal is on the third level and a number of sections in which the post-correction pulse signal is on the fourth level is larger than or equal to a sum of a number of sections in which the pre-correction pulse signal is on the first level and a number of sections in which the pre-correction pulse signal is on the second level.

13. The liquid ejecting apparatus according to claim 10, wherein the optical sensor comprises two optical sensors that are spaced away from each other by a length in the scanning direction, the length being different from a natural number times an arrangement cycle with which the first region and the second region are arranged cyclically; and
  wherein the controller is configured to output the post-correction pulse signal from each of pre-correction pulse signals outputted from the two optical sensors.

14. The liquid ejecting apparatus according to claim 10, wherein the controller is configured to detect a position on the region formation member to which a stain adheres, by comparing the pre-correction pulse signal and the post-correction pulse signal.

15. The liquid ejecting apparatus according to claim 10, wherein the first level is same as the third level; and
  wherein the second level is same as the fourth level.

16. The liquid ejecting apparatus according to claim 10, wherein the first level and the third level are high levels; and
  wherein the second level and the fourth level are low levels that are lower than the high levels.

17. The liquid ejecting apparatus according to claim 10, wherein the controller is configured to control moving velocity of the carriage based on the calculated moving velocity of the carriage.

18. The liquid ejecting apparatus according to claim 10, further comprising:
  a reference-period memory configured to individually store the first reference period and the second reference period for all of the first region and the second region of the region formation member,
  wherein the controller is configured to read out the first reference period and the second reference period from the reference-period memory, in correcting the pre-correction pulse signal.

* * * * *